United States Patent [19]

Cosson

[11] Patent Number: 4,781,253
[45] Date of Patent: Nov. 1, 1988

[54] SHIELD FOR SOIL RIPPING IMPLEMENT

[76] Inventor: Keith J. Cosson, 416 N. Washington, Grand Island, Nebr. 68801

[21] Appl. No.: 929,189

[22] Filed: Nov. 10, 1986

[51] Int. Cl.<sup>4</sup> .................. A01B 39/26; A01B 39/12
[52] U.S. Cl. .................. 172/508; 172/733; 172/740; 172/720
[58] Field of Search ............ 172/699, 700, 727, 764, 172/738, 665, 508, 196, 733, 166, 740, 730, 509, 511, 513; 37/193

[56] References Cited

U.S. PATENT DOCUMENTS

| 311,909 | 2/1885 | Miller. | |
|---|---|---|---|
| 464,102 | 12/1891 | McConnell. | |
| 589,337 | 8/1897 | Carnahan. | |
| 668,178 | 2/1901 | Harrison | 172/508 |
| 687,115 | 11/1901 | Bryant. | |
| 990,738 | 4/1911 | Hicks | 172/364 |
| 1,359,404 | 11/1920 | Lytle | 172/508 |
| 2,065,174 | 3/1936 | Dutour | 172/508 |
| 2,241,276 | 5/1941 | Smith | 172/509 |
| 2,328,174 | 8/1943 | Silver | 172/727 X |
| 2,642,791 | 6/1953 | Peacock | 172/764 X |
| 3,202,222 | 8/1965 | Norris | 172/699 X |
| 3,680,648 | 8/1972 | Tonsfeldt | 172/508 |
| 4,415,042 | 11/1983 | Cosson | 172/749 |
| 4,618,006 | 10/1986 | Cosson. | |

FOREIGN PATENT DOCUMENTS

| 1098749 | 3/1955 | France | 172/700 |
|---|---|---|---|
| 279462 | 11/1964 | Netherlands | 172/699 |
| 661914 | 12/1950 | United Kingdom | 172/699 |
| 2031252 | 4/1980 | United Kingdom | 172/700 |

OTHER PUBLICATIONS

Air and Water are Farmers Most Important Inputs-Advertizing brochure of Strom Bro Inc., West Union, Ill.
Row Cropper Advertizing Brochure of Sprayrite, Helena, AR 10/1981.

Primary Examiner—Richard J. Johnson
Attorney, Agent, or Firm—Dean P. Edmundson

[57] ABSTRACT

Agricultural tilling implements are described. In some embodiments the implements are adapted for deep tilling of soil between growing row crops, in which embodiments a horizontal shield member is detachably secured to a depending shank. The front edge of the shield is sloped upwardly. The shield prvents soil from being thrown upwardly and onto the top of growing row crops during tilling between the rows. The shield also guides loosened soil around the base of growing crops in the rows. In another embodiment the implement includes downwardly depending plate members beneath the shield to urge soil outwardly from the shank to the row crops to form a hill in each row without covering the crops. In another embodiment a V-shaped ditcher is disposed beneath the shield for forming a trench or ditch between adjacent rows of crops. In yet another embodiment a novel tilling sweep is described.

10 Claims, 8 Drawing Sheets

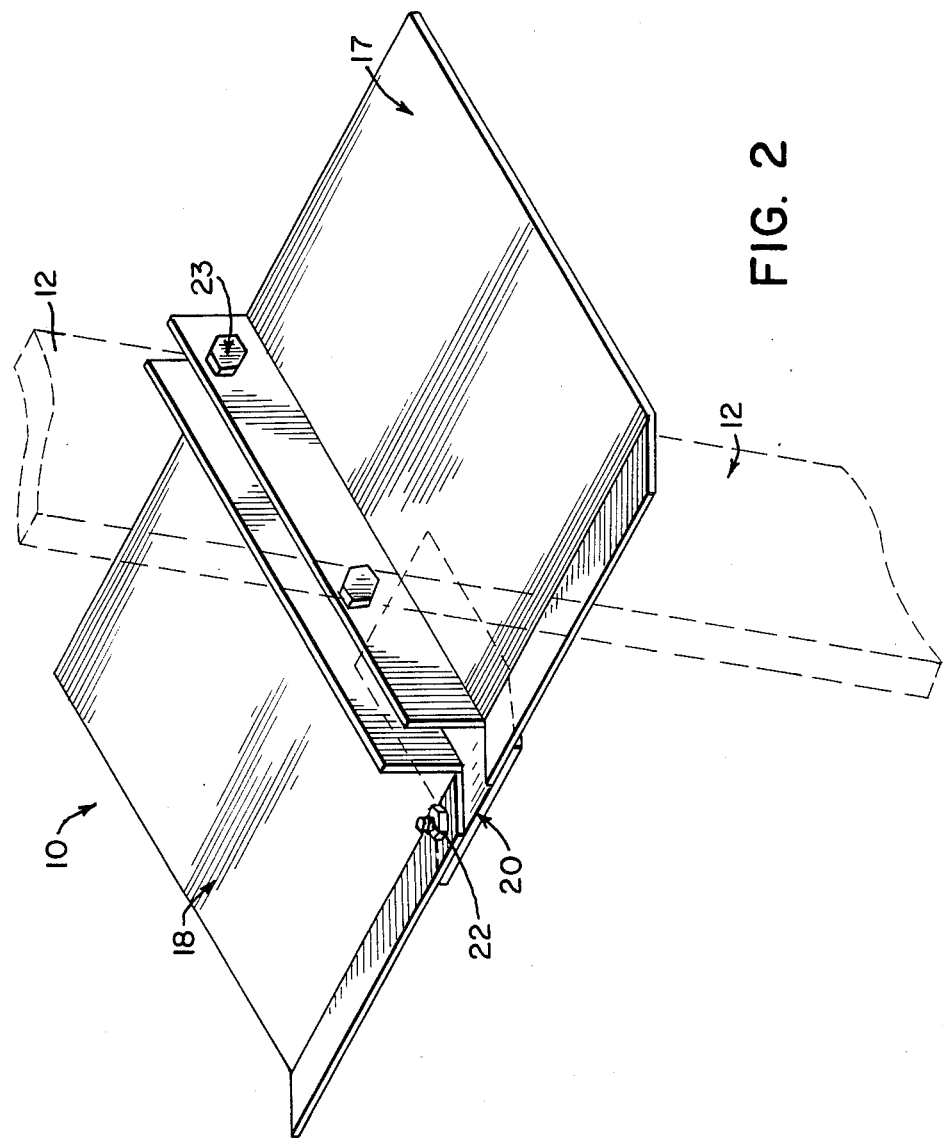

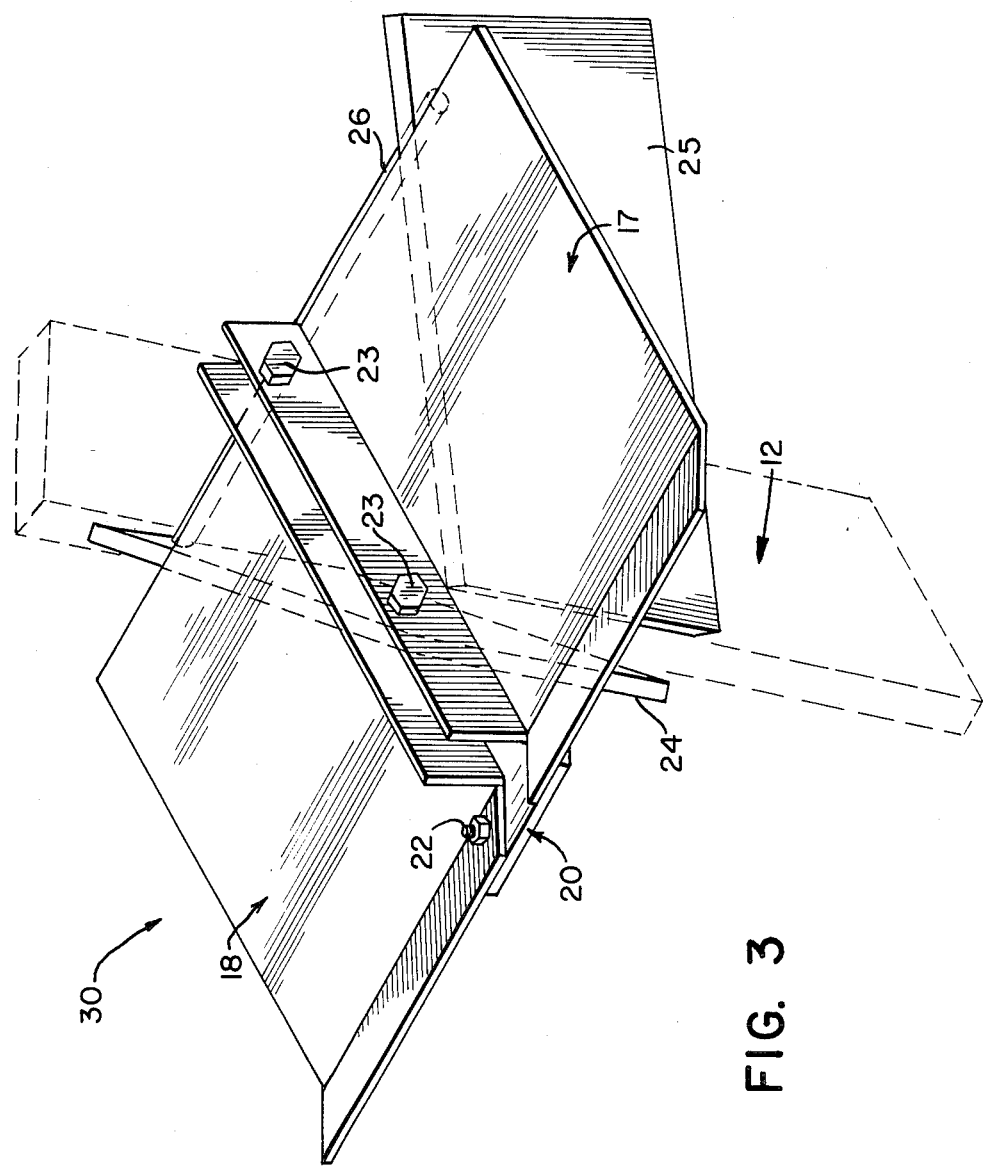

SHIELD FOR SOIL RIPPING IMPLEMENT

FIELD OF THE INVENTION

This invention relates to tilling implements of the type used in the agricultural tilling. More particularly, this invention relates to tilling implements which are useful for tillage of soil between growing row crops. In another embodiment this invention relates to ditching implements.

BACKGROUND OF THE INVENTION

Agricultural tillers of various types have been previously described and used since man began growing crops for food. Some of these prior tillers are described, for example, in U.S. Pat. Nos. 311,909; 464,102; 589,337; 668,178; 687,115; 990,738; 1,359,404; 2,065,174; 2,241,276; 4,415,042; and 4,618,006.

There have not previously been described, however, tillers of the type provided by this invention.

SUMMARY OF THE PRESENT INVENTION

In accordance with the present invention there is provided, in one embodiment, an improvement to an agricultural ripper tiller implement for deep tilling of soil between growing row crops. The tiller is of the type having a downwardly depending shank and a shoe member carried by the lower end of the shank. The improvement comprises a shield member which is adapted to be detachably secured to the shank in a generally horizontal plane. The front edge of the shield is sloped upwardly, and the shield extends outwardly from opposite sides of the shank.

The shield is positioned on the shank in a manner such that when the shank and the shoe are pulled through the soil the shield member enables soil to move outwardly from the shank to the row crops without covering the crops. The shield member also prevents large clumps and clods of dirt from being thrown upwardly by the shank and shoe. The shield also assures that the ground is closed behind the shank so as to keep the soil from drying out.

The shield member preferably is vertically adjustable on the shank. This enables the ripper to be used at any desired depth in the soil. The shield member preferably is at or just slightly above ground level when the shank and shoe are in the soil at the desired depth.

In another embodiment the invention involves the use of the shield member described above and further includes a pair of downwardly depending plate members under the shield. The plate members are angled outwardly from front to rear so that they form a V-shape, with the apex being the leading edge. One such plate member is positioned on each side of the shank.

Thus, when the shank and shoe are pulled through the soil, the shield member and the plate members urge the soil outwardly from the shank to the row crops to form a hill in each row without covering the crops. Preferably the top edges of the plate members are firmly secured to the bottom of the shield.

In yet another embodiment of the invention there is provided a ditching implement which is useful for ditching soil between row crops. This implement includes a shank member, a shield member attached to the shank in a generally horizontal plane, a V-shaped plate member disposed beneath the shield member, and support means for supporting the shank (e.g., a conventional tool bar).

When the V-shaped plate member is pulled through the soil the shield member and the V-shaped plate member urge the soil outwardly from the shank to form a ditch between the row crops. The ditch is very beneficial for movement of water when irrigating the row crops.

In still another embodiment of the invention there is provided an agricultural tilling implement for tilling soil between row crops. This implement includes a downwardly depending shank to which is attached at the lower end thereof a sweep member which is disposed in a horizontal plane. One end of the sweep member is adjacent the leading edge of the shank, and the opposite end of the sweep member projects outwardly and rearwardly relative to the shank.

The horizontal sweep member is designed to cut weeds between the rows of growing crops during tilling. More than one such sweep member may be used between the rows, if desired. This type of sweep member is especially useful for tilling purposes and may be used in conjunction with other tilling implements.

Other advantages of the implements of this invention will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which:

FIG. 2 is a front perspective view of the embodiment of agricultural tilling implement of FIG. 1;

FIG. 3 is a front perspective view of another-embodiment of agricultural tilling implement of this invention;

DETAILED DESCRIPTION OF THE INVENTION

Figure 1:
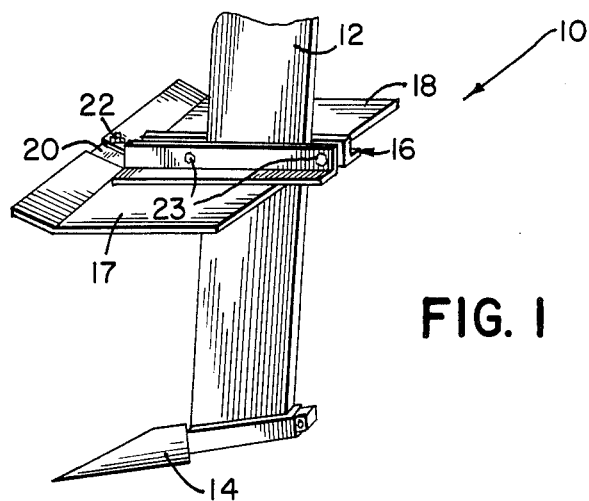
FIG. 1 is a perspective view of one embodiment of agricultural tilling implement of this invention.
Figure 1A:
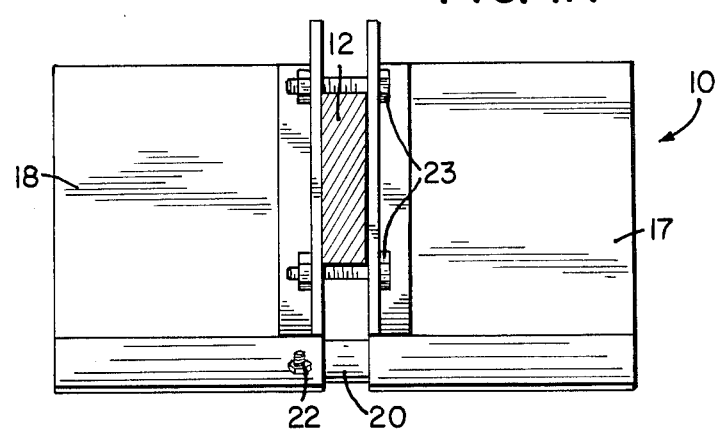
FIG. 1A is a top view of the tilling implement shown in FIG. 1.

In FIGS. 1, 1A and 2 there is shown one embodiment of agricultural tilling implement 10 of the invention which includes downwardly depending shank 12 having a conventional shoe member 14 on the lower end thereof. A shield member 16 is detachably secured to the shank in a generally horizontal plane and is spaced above the shoe by several inches (e.g., about 8 to 16 inches) depending upon the depth at which one desires to put the shank and shoe into the soil for tilling.

The shield member conveniently comprises two sections 17 and 18 which are connected together, with the shank 12 between them, by means of bolts 23. In this manner the shield member may be detached from the shank, if desired, and it may be adjusted vertically to any desired height relative to the shoe 14 on the shank. Preferably the height of the shield is adjusted such that it is at or near ground level when the shoe and shank are in the soil at the desired depth. Preferably a small shield or plate 20 is connected between shield sections 17 and 18 ahead of the leading edge of shank 12. A bolt 22 may be used to secure plate 20 to one of the large shield sections. Preferably shield or plate 20 extends back to the leading edge of shank 12, as shown. Alternatively, shield or plate 20 may be welded to one of the shields 17 or 18.

The leading edge of each shield is sloped upwardly as shown so that the shield member prevents soil from passing over the top of the shield member during tilling.

Each shield section 17 and 18 projects outwardly from a respective side of the shank 12 several inches (typically at least about 8 inches on each side). The shield member also projects forwardly of the shank a few inches (e.g., at least about 4 or 6 inches).

The desired width of the shield member is dependent upon the spacing between adjacent rows of growing crops. For example, when the crops are in rows which are 30 inches apart, the shield should extend outwardly at least 9 inches on each side of the shank. For a shank which is 1 inch wide this would mean that the span from one side of the shield member to the opposite side would be 19 inches. When the implement is operated between rows having 30 inch spacing the edges of the shield member would be about 6 inches from each row. When the row spacing is greater than 30 inches the shield member may be wider than 19 inches in span.

Generally speaking, for use between growing row crops, each section of the shield member on the shank should be at least about 8 inches wide and may be as much as 14 inches wide. The shield preferably projects forwardly of the shank a few inches, as shown, and may extend forwardly of the shank several inches.

For deep tilling of soil the shoe may be about 8 to 16 inches deep in the soil. The shield member is appropriately adjusted on the shank such that it is at or near ground level when the shoe is at the desired depth for tilling.

The shield member prevents soil clumps from being thrown out of the ground and onto the growing crops during tilling between the rows. The shield member also assures that loosened soil moves outwardly smoothly toward the rows and that the soil becomes mixed. The shield member further closes the ground behind the shank as it moves through the soil. This keeps the ground from drying out quickly. The loosened soil then also accepts water rapidly and prevents run-off and soil erosion.

The shield member illustrated herein may be attached to any type of ripper shank. For example, it may be attached to a conventional straight shank or curved shank. Any type of shoe may be used on the shank. As is well known and understood in the art, the ripper shank is supported by a tool bar or frame which is connected to the farm tractor for towing through the field. Typically the implement includes a plurality of ripper shanks so that the soil between several rows may be tilled in one pass through the field.

Figure 4:
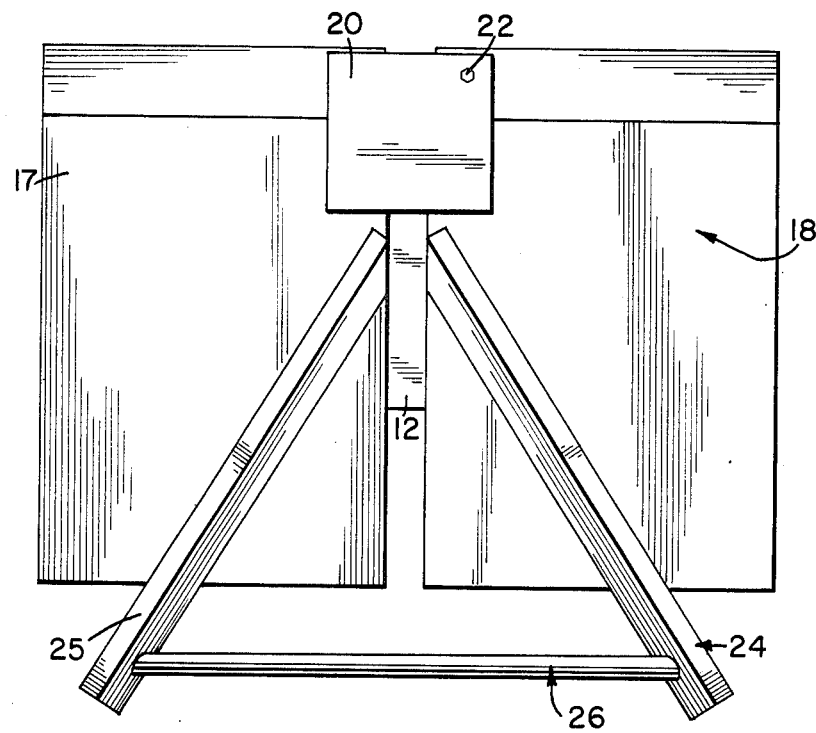
FIG. 4 is a bottom view of the embodiment of tilling implement shown in FIG. 3.

FIG. 3 is a front perspective view of another embodiment of agricultural tilling implement 30 of the invention. FIG. 4 is a bottom view of it. The ripper shank 12 is shown in dotted lines and is only shown in partial length in the drawings. A conventional shoe member may be attached to the lower end of the shank, for example, as illustrated in FIG. 1. The upper end of the shank is attached to a tool bar or frame as is conventional in the art.

The shield member which is detachably connected to the shank is the same as that described above in connection with FIGS. 1–2. Below the shield are two plate members 24 and 25. The front edge of each plate is disposed adjacent the front or leading edge of shank 12, while the trailing end of each plate is spaced outwardly from the shank so that the two plates are in a generally V-shape.

Preferably the top edge of each plate is secured to the bottom side of the shield member (e.g., by welding). If desired, a cross brace or rod 26 may be connected between the rear portions of the plate members 24 and 25.

The height of each plate may vary, for example, from about 5 to 10 inches. The length may also vary, for example, from about 10 to 15 inches or so.

This arrangement is very beneficial for urging soil outwardly from the shank during tilling and moving the soil gently around the base of growing plants in the rows in a controlled manner. Thus, the soil urged toward the plants forms a desirable hill in each row around the plants and covers small weeds in the row. The shield also closes the soil behind the shank and reduces soil erosion.

Figure 8:
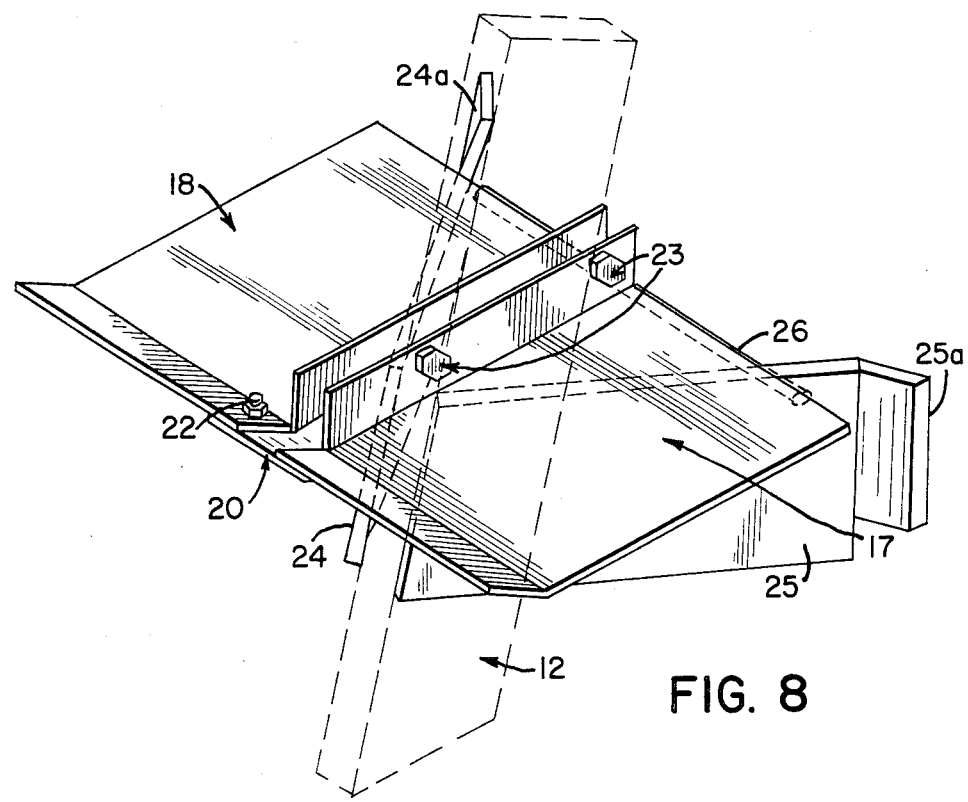
FIG. 8 is a perspective view of another embodiment of tilling implement of the invention.

Another variation of the embodiment shown in FIGS. 3 and 4 is illustrated in FIG. 8. In this embodiment the rear or trailing portion of plate members 24 and 25 include a deflector wing or plate 24a and 25a, respectively. The wings or plates serve to increase the extent to which loosened soil is urged outwardly toward the rows of growing crops so that larger hills are formed in the rows around the base of the plants. The wings or plates 24a and 25a may vary in size (e.g. they may be, for example, 6 inches high and 4 inches long), and they project outwardly, as illustrated.

Figure 5:
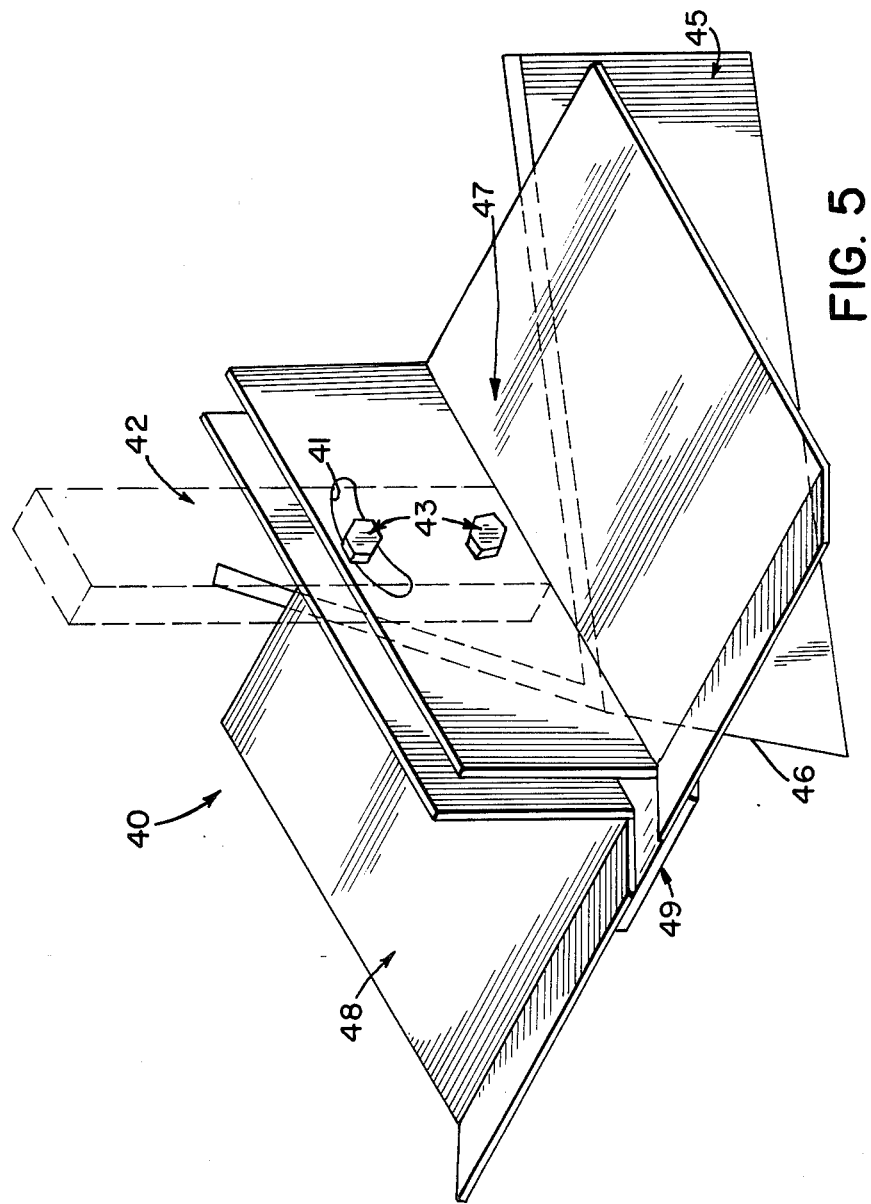
FIG. 5 is a front perspective view of another embodiment of an implement of this invention which is useful for forming ditches or trenches between row crops.

In FIG. 5 there is shown a front perspective view of a ditching implement 40 of the invention comprising a downwardly depending shank 42. Attached to the lower end of shank 42 is a horizontal shield member comprising sections 47 and 48. The front edge of the shield is sloped upwardly as illustrated, and a small plate or shield 49 is preferably connected between sections 47 and 48 and may be welded or bolted to one of such sections.

Disposed beneath the shield member is a V-shaped plate member 45 having outwardly flaring wings, as illustrated. Preferably the top edges of the plate member 45 are secured to the bottom of the shield sections (e.g., by welding). The apex 46 of the plate member 45 is the leading edge.

When this ditching implement is pulled through the soil the shield and the V-shaped plate member urge soil outwardly from the shank to form a ditch between the rows of growing crops. The resulting ditch is useful when irrigating the growing crops. This implement also urges soil towards the growing crops and covers small weeds in the row.

The shank 12 may be, for example, 1 inch by 3 inches and about 36 inches long. The upper end of the shank is attached to a conventional tool bar or frame for towing through the field.

The plate member 45 is, for example, about 5 to 10 inches in height. The length of each side of the plate member may also vary, for example, from about 10 to 15 inches or so.

The shield sections in implement 40 may be attached to shank 42 by means of bolts 43, as illustrated in FIG. 5. Preferably the vertical flange of each shield section includes a slotted aperture 41 so that the shield and the plate member 45 may be tilted upwardly or downwardly, as desired.

Figure 9:
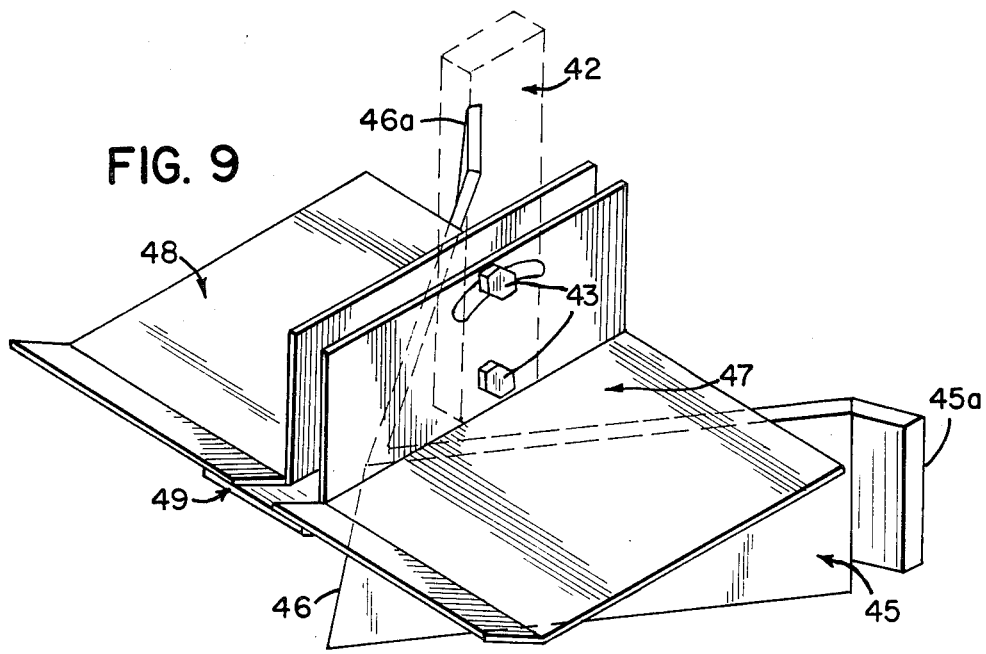
FIG. 9 is a perspective view of another embodiment of an implement of this invention for forming ditches or trenches between row crops.

Another variation of the embodiment shown in FIG. 5 is illustrated in FIG. 9. In this embodiment the rear or trailing portion of each side of plate member 45 includes a deflector wing or plate (denoted as 45a on one side and 46a on the other side). The wings or plates serve to increase the extent to which loosened soil is urged outwardly toward the rows of growing crops so that larger hills are formed in the rows around the base of the plants. The wings or plates 45a and 46a may vary in size (e.g. they may be, for example, 6 inches high and 4 inches long), and they project outwardly, as illustrated.

Figure 6:
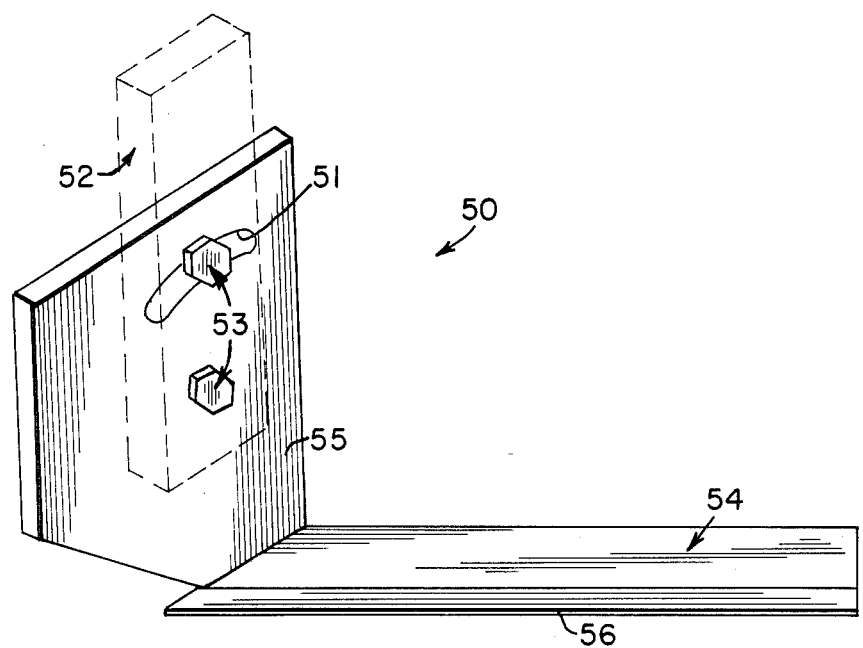
FIG. 6 is a perspective view of another tilling implement of this invention.

In FIG. 6 there is shown a front perspective view of another agricultural tilling implement 50 of the invention for tilling soil between growing row crops. The implement includes a downwardly depending shank 52 (which may be similar to shank 42 described above in connection with FIG. 5). A sweep member 54 is attached to the lower end of shank 52 (for example, by means of vertical flange 55 and bolts 53).

Figure 7:
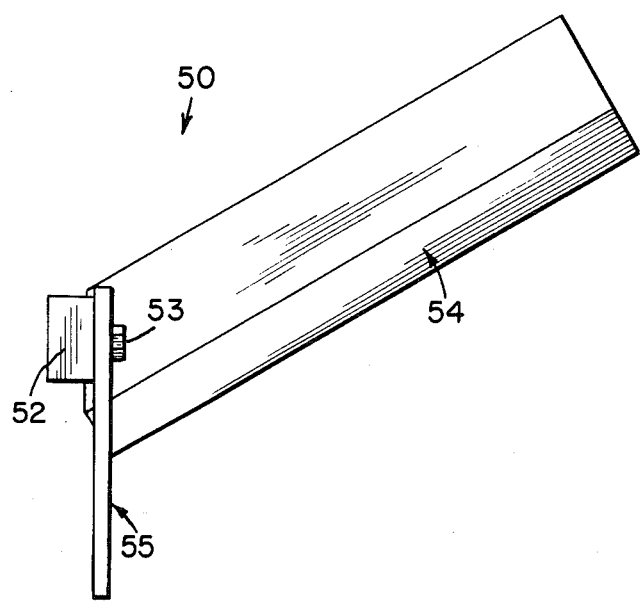
FIG. 7 is a top view of the tilling implement shown in FIG. 6.

The sweep member 54 is disposed in a horizontal plane, and leading edge 56 is sharpened. As illustrated in the top view of FIG. 7, the sweep member is angled outwardly and rearwardly with respect to the shank 52.

This tilling implement is carried by a conventional tool bar or frame of a tiller and is preferably used ahead of a ripper, at a depth of about 2 to 3 inches in the soil, to cut weeds growing between the rows. More than one such sweep member may be used between adjacent rows of crops.

The length of the sweep member may vary, for example, from about 10 to 15 inches. The angle between the sweep member and the shank may also vary. Preferably, the front edge of the sweep member is angled rearwardly about 20 to 40 degrees.

The sweep member may also be tilted upwardly or downwardly, as desired, by loosening bolts 53. Slotted aperture 51 in flange 55 allows the sweep member 54 to be tilted, as desired.

Other variants are possible without departing from the scope of this invention.

What is claimed is:

1. In an agricultural ripper tiller implement for deep tilling of soil between growing row crops, wherein said implement includes a downwardly depending shank and a shoe member carried by the lower end of said shank; wherein the improvement comprises a shield member which is adapted to be detachably secured to said shank in a generally horizontal plane; wherein the front edge of said shield member is sloped upwardly; wherein said shield member extends outwardly from opposite sides of said shank at least about 8 inches; wherein said shield member is positioned on said shank in a manner such that when said shank and shoe are pulled through the soil said shield member enables soil to move outwardly from said shank to said row crops while preventing soil from being thrown upwardly and covering said crops; wherein said shield member comprises first and second sections which are detachably connected to each other, with said shank being disposed between said sections; and further comprising a third section which extends between said first and second sections in front of said shank.

2. The improvement of claim 1, wherein said shield member extends forwardly of said shank at least about 4 inches.

3. The improvement of claim 1, wherein said shield member is vertically adjustable on said shank.

4. The improvement of claim 1, wherein said first and second sections are bolted together.

5. The improvement of claim 1, further comprising first and second downwardly depending plate members having front and rear portions, wherein said first plate member is disposed beneath said shield member on one side of said shank and said second plate member is disposed beneath said shield member on the opposite side of said shank; wherein the front portion of each said plate member is disposed adjacent the front edge of said shank, and wherein the rear portion of each said plate member is spaced outwardly from said shank in a manner such that said plate members form a V-shape, whereby when said shank and shoe are pulled through the soil said shield member and said plate members urge said soil outwardly from said shank to said row crops to form a hill in each said row without covering said crops.

6. The improvement of claim 5, wherein each said plate member has a height of at least about 6 inches.

7. The improvement of claim 5, wherein the length of each said plate member is at least about 10 inches.

8. The improvement of claim 5, wherein the top edges of said first and second plate members are secured to said shield member.

9. The improvement of claim 8, wherein said top edge of each said plate member is welded to the underside of said shield member.

10. The improvement of claim 8, wherein a brace member is connected between said rear portions of said plate members.

* * * * *